United States Patent [19]

Jozwiak, Jr.

[11] 4,297,261
[45] Oct. 27, 1981

[54] CATIONIC POLYMERS AND THEIR USE IN ELECTRODEPOSITION

[75] Inventor: Edward L. Jozwiak, Jr., Gibsonia, Pa.

[73] Assignee: PPG Industries, Inc., Pittsburgh, Pa.

[21] Appl. No.: 162,225

[22] Filed: Jun. 23, 1980

[51] Int. Cl.³ .............................................. C08L 63/10
[52] U.S. Cl. .................... 260/29.7 RP; 204/181 C; 260/29.2 EP; 260/29.6 NR; 260/29.7 NR
[58] Field of Search ............... 260/29.2 EP, 29.6 NR, 260/29.7 NR, 29.7 RP; 525/529, 530, 531, 532; 526/312; 204/181 C

[56] References Cited

U.S. PATENT DOCUMENTS

| | | | |
|---|---|---|---|
| 3,538,039 | 11/1970 | Lantz | 525/529 |
| 3,563,929 | 2/1971 | Guldenpfennig | 260/29.6 NR |
| 3,719,626 | 3/1973 | May | 260/29.6 NR |
| 4,033,917 | 7/1977 | Sekmakas | 260/29.2 N |
| 4,055,527 | 10/1977 | Jozwiak | 204/181 C |
| 4,064,087 | 12/1977 | Das | 260/29.6 RB |
| 4,085,161 | 4/1978 | Sekmakas | 260/29.6 HN |
| 4,139,396 | 2/1979 | Otsuki | 260/29.2 EP |
| 4,139,510 | 2/1979 | Anderson | 260/29.2 EP |
| 4,151,143 | 4/1979 | Blank | 260/29.6 RW |
| 4,198,331 | 4/1980 | Buchwalter | 260/29.2 EP |
| 4,212,779 | 7/1980 | Schmolzer | 260/29.2 EP |
| 4,248,753 | 2/1981 | Buchwalter | 260/29.2 EP |

*Primary Examiner*—Paul R. Michl
*Attorney, Agent, or Firm*—William J. Uhl

[57] ABSTRACT

Polymeric products are prepared by polymerizing in aqueous medium under addition polymerization conditions a dispersed phase of a polymerizable, ethylenically unsaturated monomer or mixture of polymerizable, ethylenically unsaturated monomers in the presence of an at least partially neutralized adduct of a polyepoxide and a primary and/or secondary amine and which contains unsaturation. The polymeric products are useful in water-based coating compositions particularly for use in cationic electrodeposition.

34 Claims, No Drawings

CATIONIC POLYMERS AND THEIR USE IN ELECTRODEPOSITION

CROSS REFERENCE TO COPENDING APPLICATIONS

Reference is made to copending Applications Ser. Nos. 162,223 and 162,224 filed even date herewith.

Application Ser. No. 162,223 describes polymeric products which are prepared by polymerizing in aqueous medium under addition polymerization conditions a dispersed phase of a polymerizable, ethylenically unsaturated monomer or mixture of polymerizable, ethylenically unsaturated monomers in the presence of a partially neutralized amine group-containing polymeric dispersant.

Application Ser. No. 162,224 describes polymeric products which are prepared by polymerizing in aqueous medium under addition polymerization conditions a dispersed phase of a polymerizable, ethylenically unsaturated monomer or mixture of polymerizable, ethylenically unsaturated monomers in the presence of a quaternary ammonium base group-containing polymer which is formed from reacting a polyepoxide with an unsaturated tertiary amine in the presence of a proton source.

BACKGROUND OF THE INVENTION

1. Field of the Invention:

The present invention relates to polymeric products and to aqueous dispersions of polymeric products. More particularly, this invention relates to polymeric products containing cationic salt groups and to their use in electrodeposition.

2. Brief Description of the Prior Art:

Polymerization of diene and vinyl monomers in the presence of aqueous dispersions of anionic polymers is well known in the art. For example, U.S. Pat. No. 4,055,527 to Jozwiak and Das discloses polymerization of dienes and mixtures of dienes and vinyl monomers in aqueous dispersions in the presence of partially neutralized maleinized oils. U.S. Pat. No. 4,151,143 to Blank discloses a two-stage polymerization process for the preparation of anionic acrylic polymer emulsions. The first stage involves the preparation of an acrylic polymer with COOH groups. The polymer is neutralized with a base and dispersed in water. The second stage involves polymerizing a mixture of vinyl monomers in the previously prepared dispersion.

U.S. Pat. No. 4,064,087 to Das is similar to U.S. Pat. No. 4,151,143 mentioned above with the exception that the COOH-containing acrylic polymer also contains pendent double bonds.

SUMMARY OF THE INVENTION

In accordance with the present invention, stable aqueous dispersions of cationic polymeric products are prepared by polymerizing in aqueous medium under free radical initiated addition polymerization conditions:

(A) an aqueous dispersed phase of a polymerizable, ethylenically unsaturated monomer composition, in the presence of (B) an at least partially acid neutralized polyepoxide-primary and/or secondary amine adduct which contains pendent unsaturation.

The invention also provides coating composition comprising the aqueous dispersions of the polymeric products, a method of preparing the polymeric products and a method of electrocoating an electrically conductive surface serving as a cathode in an electrical circuit comprising said cathode, an anode and an aqueous electrodepositable composition which comprises passing an electric current between said cathode and anode and wherein the electrodepositable composition comprises the aforementioned polymeric product.

OTHER PATENTS

Besides the patents mentioned above, other patents of which applicant is aware are as follows:

U.S. Pat. No. 4,033,917 discloses the reaction of polyepoxides with fatty amines to form epoxy-free unsaturated products. These products are then further reacted with a copolymerizable ethylenically unsaturated monomer component, a portion of which contains amine functionality, for example, a mixture of styrene and dimethylaminopropyl methacrylate. The resultant reaction product is treated with acid and dispersed in water to form an aqueous cationic polymer dispersion.

U.S. Pat. No. 4,085,161 is similar to U.S. Pat. No. 4,033,917 mentioned above with the exception that an ethylenically unsaturated blocked isocyanate, for example, toluene diisocyanate capped with hydroxyethyl acrylate and a saturated alcohol, is included with the ethylenically unsaturated monomer component.

The present invention differs from these patents in that the ethylenically unsaturated monomer component is polymerized in aqueous dispersion in the presence of a cationic polymer. These patents, on the other hand, disclose polymerization with the unneutralized polymer in organic solvent. After reaction, neutralization and dispersion in water takes place.

DETAILED DESCRIPTION

As mentioned above, the invention provides a polymeric product which is prepared in aqueous medium under addition polymerization conditions. An ethylenically unsaturated polymerizable monomer composition such as a monomer or mixture of monomers which contain $CH_2=CH-$ moieties, for example, diene monomers, vinyl monomers and mixtures thereof is dispersed in aqueous medium and is subjected to addition polymerization conditions, for example, by heating in the presence of a free radical initiator. The polymerization is conducted in the presence of an at least partially neutralized polyepoxide-amine adduct which contains pendent unsaturation and in which the amine is derived from a primary amine, secondary amine or mixtures thereof.

The monomer composition can be selected from a variety of polymerizable ethylenically unsaturated materials particularly those having $CH_2=CH-$ moieties such as vinyl monomers, diene monomers and mixtures thereof. Examples of vinyl monomers which may be used are monoolefinic and diolefinic hydrocarbons such as $C_1-C_{18}$ alkyl acrylates and methacrylates. Examples include methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. Besides the alkyl esters of acrylic and methacrylic acid mentioned above, substituted alkyl esters, for example, hydroxyalkyl esters such as hydroxyethyl and hydroxypropyl acrylate and methacrylate can also be used.

Examples of other vinyl monomers are esters of organic acids such as vinyl acetate and isopropenyl acetate; allyl compounds such as allyl cyanide; amides of acrylic and methacrylic acid such as acrylamide and methacrylamide and their N-alkoxymethyl derivatives such as N-ethoxymethyl and N-butoxymethyl acrylamide and methacrylamide. Also, vinyl aromatic compounds such as styrene, alpha-methyl styrene, alpha-chloro styrene and vinyl toluene may be used, as well as organic nitriles such as acrylonitrile and methacrylonitrile. Mixtures of vinyl monomers may be used.

Various dienes which may be used include 1,3-butadiene, isoprene and most of the di-unsaturated members of the alkylidene series including both the unsubstituted and substituted conjugated diolefins. The substituted diolefins may be those containing lower alkyl groups or halogen groups directly bonded to the alkylidene chain. Representative examples of these diolefins include chloroprene and 2,3-dimethylbutadiene. Also, mixtures of dienes as well as mixtures of dienes and vinyl monomers can be used.

The polyepoxide-amine adducts which are used in the practice of the invention are formed from reacting an organic polyepoxide with a primary or secondary amine including mixtures thereof. The polyepoxides which are used in the practice of the invention are polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A. These polyepoxides can be produced by etherification of a polyphenol with epihalohydrin or dihalohydrin such as epichlorohydrin or dichlorohydrin in the presence of alkali. Examples of polyphenols other than bisphenol A are 1,1-bis-(4-hydroxyphenyl)ethane, 2-methyl-1,1-bis-(4-hydroxyphenyl)propane, 2,2-bis(4-hydroxy-3-tertiarybutylphenyl)propane, bis-(2-hydroxynaphthyl)methane, 1,5-dihydroxynaphthalene or the like.

Besides polyphenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis(hydroxymethyl)cyclohexane and hydrogenated bisphenol A.

Also, oxyalkylated adducts such as ethylene and propylene oxide adducts of these alicyclic polyols and polyphenols mentioned above can be used as the cyclic polyol component.

Examples of other polyepoxides are polyglycidyl ethers of polyhydric alcohols, such as ethylene glycol, diethylene glycol, triethylene glycol, 1,2-propylene glycol, 1,3-propylene glycol, 1,4-butylene glycol, 1,5-pentanediol and the like.

Polyglycidyl esters of polycarboxylic acids which are produced by reaction of epichlorohydrin or a similar epxoy compound with an aliphatic or aromatic polycarboxylic acid can also be used. Examples of polycarboxylic acids are dicarboxylic acids such as adipic acid, succinic acid, glutaric acid, terephthalic acid, dimerized linoleic acid and the like.

The polyepoxides such as the preferred polyglycidyl ethers of cyclic polyols can be further reacted to chain extend and increase their molecular weight. For example, they may be further reacted with active hydrogen-containing materials which are reactive with the epoxy groups such as those containing primary hydroxy groups. Examples of chain extenders are organic polyols, preferably polymeric polyols such as polyester polyols including polylactone polyols. Chain extending of epoxy-containing polymeric materials with polymeric polyols is disclosed in U.S. Pat. No. 4,148,772 to Marchetti, Zwack and Jerabek and assigned to PPG Industries, Inc.

The polyepoxide can also be chain extended with N-heterocyclic-containing materials such as described in U.S. Pat. No. 4,144,159 to Bosso and Castellucci and assigned to PPG Industries, Inc.

The organic amine which is reacted with the polyepoxide can be a primary or secondary amine or mixtures thereof. To introduce cationic salt groups into the epoxy-amine adduct, the polyepoxide-amine adduct is at least partially neutralized to form amine salt groups.

The preferred amines are monoamines. Polyamines such as ethylene diamine, diethylene triamine, triethylene tetramine, N-(2-aminoethyl)ethanolamine and piperizine can be used but their use is not preferred because they are multifunctional with regard to amine and have a greater tendency to gel the reaction mixture than monoamines.

Secondary amines are preferred to primary amines because the primary amines are difunctional and have a greater tendency to gel the reaction mixture. When using polyamines or primary amines, special precautions should be taken to avoid gelation. For example, excess amine can be used and the excess vacuum stripped at the completion of the reaction. Also, the polyepoxide can be added to the amine to insure that excess amine will be present. Examples of suitable monoamines are mono and dialkyl amines and mixed alkyl-aryl amines and substituted amines in which the substituents do not detrimentally affect the polyepoxide-amine reaction. Specific examples of these amines are ethylamine, propylamine, methyl ethyl amine and diethylamine. Examples of substituted amines are hydroxyl-containing amines such as alkanolamines, dialkanolamines, alkyl alkanolamines and aryl alkanolamines containing from 2 to 18 carbon atoms in the alkanol, alkyl and aryl chains. Specific examples include ethanolamine, N-methylethanolamine, diethanolamine and N-phenylethanolamine.

Mixtures of the various amines described above can be used. The reaction of a primary and/or a secondary amine with the polyepoxide takes place upon mixing the amine with the polyepoxide. The reaction can be conducted neat or optionally in the presence of a suitable organic solvent. The reaction may be exothermic and cooling may be desired. However, heating at moderate temperature, that is, within the range of 50° to 150° C., may be used to hasten the reaction.

The reaction product of the primary or secondary amine with the polyepoxide attains its cationic character by at least partial neutralization, for example, by treating with an acid forming secondary or tertiary amine salts. Examples of suitable acids include organic and inorganic acids such as formic acid, acetic acid, lactic acid and phosphoric acid. Besides acids, salts such as dimethylhydroxyethylammonium dihydrogenphosphate and ammonium dihydrogenphosphate can be used. The extent of neutralization will depend upon the particular product involved. It is only necessary that sufficient neutralizing agent be used to solubilize or disperse the product in water. Typically, the amount of neutralizing agent used will be sufficient to provide at least 30 percent of the total theoretical neutralization.

In addition to the primary and secondary amines disclosed above, a portion of the amine which is reacted with the polyepoxide can be a ketimine or a polyamine. This is described in U.S. Pat. No. 4,104,147 in column 6, line 23, to column 7, line 23, the portions of which are hereby incorporated by reference. The ketimine groups will decompose upon dispersing the polyepoxy-amine adduct in water resulting in free primary amine groups which would be reactive with a curing agent which are described in more detail below.

In general, most of the cationic polymers useful in the practice of the invention have average molecular weights (calculated values) within the range of 500 to 5000, preferably about 1000 to 3000, and contain from about 0.1 to 3.0, preferably from about 0.3 to 1.0 milliequivalents of cationic nitrogen per gram of resin solids. Obviously, one must use the skill in the art to couple the molecular weight of the cationic group content to arrive at a satisfactory polymer.

The polyepoxide-amine adduct also contains pendent unsaturation which can be incorporated into the polymer in a variety of ways. For example, at least a portion of the primary and/or secondary amine can be an ethylenically unsaturated amine including monoethylenically unsaturated amines and polyethylenically unsaturated amines. Examples include allylamine, diallylamine, amines derived from drying and semi-drying fatty acids such as soya fatty acid, oleic acid, linoleic acid and linolenic acid. Also a portion of the epoxy groups can be etherified with an ethylenically unsaturated alcohol including monoethylenically unsaturated alcohols and polyethylenically unsaturated alcohols. Examples include allyl alcohol, hydroxyethyl methacrylate and oleyl alcohol. Pendent unsaturation can also be incorporated into the polymer through the polyepoxide moiety, for example, by using 2,2-bis(3-allyl-hydroxyphenyl)-propane in the preparation of the polyglycidyl ether of a cyclic polyol.

The amount of pendent unsaturation present in the polymer can vary over fairly wide ranges. The unsaturation equivalent or the weight per unsaturated moiety will vary between about 500 to 10,000 and usually 1000 to 6000 (calculated values).

As mentioned above, the polyepoxide-amine adduct is at least partially neutralized to form cationic salt groups which are necessary for subsequent dispersion in water. The step of dispersion is accomplished by combining the neutralized or partially neutralized polymer with the aqueous medium. Neutralization and dispersion can be accomplished in one step by combining the polyepoxide-amine adduct and aqueous medium which contains the neutralizing agent. The polyepoxide-amine adduct (or its acid salt) can be added to the aqueous medium or the aqueous medium added to the polymer (or its salt). The pH of the dispersion is preferably within the range of 2 to 8.

The neutralized or partially neutralized polyepoxide-amine adduct serves as a dispersant for the subsequent polymerization of the dispersed phase of the polymerizable, ethylenically unsaturated monomer composition.

The monomer component is dispersed in the aqueous medium in the presence of the polyepoxide-amine dispersant and subjected to addition polymerization conditions such as by heating in the presence of a free radical initiator. The time and temperature of polymerization will depend on one another, the ingredients selected and the scale of the reaction. Usually polymerization will be between about 2 to 20 hours at 75° to 100° C.

For electrodeposition end use, the polymerization is preferably conducted in the presence of an oil-soluble free radical polymerization initiator and preferably in the presence of a chain transfer agent which is also oil soluble. Water-soluble salt-forming free radical catalysts are preferably not used when the product is to be used in electrodeposition.

Examples of free oil-soluble free radical initiators are those which are soluble in the monomer component such as azobisisobutyronitrile, azobis(alpha, gamma-dimethylvaleronitrile), tertiary-butyl perbenzoate, tertiary-butyl peracetate, benzoyl peroxide and ditertiary butyl peroxide.

The amount of free radical initiator which is used should be about 1 to 4 percent by weight based on weight of polymerizable monomer component.

Preferably, a chain transfer agent which is soluble in the monomer component such as alkyl mercaptans, for example, tertiary-dodecyl mercaptan, 2-mercaptoethanol, isooctyl mercaptopropionate, n-octyl mercaptan or 3-mercapto acetic acid is preferably incorporated into the polymer charge. Other chain transfer agents such as ketones, for example, methyl ethyl ketone, chlorocarbons such as chloroform can be used. Chain transfer agents provide the necessary control over molecular weight to give products having the required viscosity for electrodeposition. Tertiary-dodecyl mercaptan is preferred. If used, the amount of chain transfer agent should be about 1 to 6 percent by weight based on weight of polymerizable monomer composition.

Preferred products are obtained from using about 2.5 to 50, preferably 5 to 25 percent by weight of the polyepoxide-amine dispersant and from about 50 to 97.5, preferably 95 to 75 percent by weight of the dispersed phase of the monomer component; the percentage by weight being based on total weight of the dispersant and the dispersed phase.

For polymerization of the dispersed phase in the presence of the dispersant, the aqueous medium preferably should be present in amounts of about 50 to 90, preferably about 55 to 75 percent by weight based on total weight of the dispersant and the aqueous medium.

Besides water, the aqueous medium can contain some organic cosolvents. The organic cosolvents are preferably at least partially soluble with water. Examples of such solvents include oxygenated organic solvents such as monoalkyl ethers of ethylene glycol and diethylene glycol which contain from 1 to 4 carbon atoms in the alkyl group such as the monoethyl and monobutyl ethers of ethylene glycol and diethylene glycol. Examples of other water-soluble solvents include alcohols such as ethanol, isopropanol, butanol and diacetone alcohol. If used, the organic cosolvents are used in amounts less than 10 and preferably less than 5 percent by weight based on total weight of the aqueous medium.

Polymeric products can be prepared in accordance with the present invention to form stable aqueous dispersions. By stable is meant the dispersions will not gel, flocculate nor precipitate at a temperature of 25° C. for at least 60 days. If some precipitation does occur, the precipitate can be easily redispersed by low shear agitation. The aqueous dispersions are usually two-phase, translucent, aqueous polymer systems in which the aqueous phase forms the continuous phase.

The polymeric products of the present invention contain active hydrogens such as hydroxyl, primary and secondary amino which make them reactive at elevated temperatures with a curing agent. The curing agent which is used should be one which is stable in the dispersion of the polymeric product at room temperature but reactive with the active hydrogens at elevated temperature, that is, from about 90° to 260° C., to form a crosslinked product. Examples of suitable curing agents are capped or blocked isocyanates, aminoplast resins and phenolic resins such as phenol-formaldehyde condensates including allyl ether derivatives thereof.

Examples of capped isocyanates are those described in U.S. Pat. No. 4,104,147, column 7, line 36, continuing to column 8, line 37, the portions of which are hereby incorporated by reference.

Sufficient capped isocyanate is present such that the equivalent ratio of latent isocyanate groups to active hydrogens of the polymer is at least 0.1:1, preferably about 0.3 to 1:1.

Examples of aminoplast resins are those described in U.S. Pat. No. 3,937,679 to Bosso and Wismer in column 16, line 3, continuing to column 17, line 47, the portions of which are hereby incorporated by reference. Also disclosed in the aforementioned portions of the '679 patent, the aminoplast can be used in combination with the methylol phenol ethers. Aminoplast curing agents usually constitute from about 1 to 60, preferably 5 to 40 percent by weight of the resinous composition based on total weight of aminoplast and the polymeric product.

The resin solids content of the aqueous dispersions of the polymeric products of the present invention depends upon the particular end use of the dispersion and is in general not critical. Aqueous dispersions containing at least 1 and usually from about 5 to 40 percent by weight resin solids are typical. For electrodeposition use, resin solids contents of about 5 to 20 percent are usually used.

Aqueous dispersions of the polymeric products of the present invention can be used in coating applications. The coating composition can be used to form clear coatings or optionally can be pigmented. The pigments may be any of the conventional type comprising, for example, iron oxides, lead oxides, strontium chromate, carbon black, coal dust, titanium dioxide, talc, barium sulfate, as well as color pigments such as cadmium yellow, cadmium red, chromium yellow, phthalocyanine blue and the metallic pigments such as aluminum flake. The pigment content of the dispersion is usually expressed as the pigment-to-resin ratio. Pigment-to-resin ratio within the range of 0.02 to 1:1 is typical.

In addition to pigment, various additives such as fillers, plasticizers, anti-oxidants, ultraviolet light absorbers, defoamers, fungicides, flow control agents, surfactants and other formulating additives can optionally be employed if desired. These materials will generally constitute up to 20 percent by weight of the aqueous dispersion based on total solids.

When the aqueous dispersions are employed for electrodeposition use, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The applied voltage can be varied and can be, for example, as low as one volt to as high as several thousand volts, but typically between 50 and 500 volts. Current density is usually between 1.0 ampere and 15 amperes per square foot and tends to decrease during electrodeposition indicating the formation of an insulating film.

The aqueous dispersions of the polymeric products of the present invention can also be used in other conventional coating applications such as flow, dip, spray and roll coating applications. For electrodeposition and other conventional coating applications, the coating composition can be applied to a variety of electroconductive substrates especially metal such as steel, aluminum, copper, magnesium and the like, but also including metallized plastic and conductive carbon-coated materials. For other conventional coating applications, the compositions can be applied to non-metallic substrates such as glass, wood and plastic.

After a coating has been applied by electrocoating or other conventional coating applications, it is cured usually by baking at elevated temperatures such as 90° to 260° C. for about 1 to 30 minutes. The cured coating will generally have a thickness of about 0.1 to 10, usually 0.5 to 5 mils, depending upon the solids content of the coating composition and the method of applying the coating.

Illustrating the invention are the following examples, which, however, are not to be considered as limiting the invention to their details. All quantities are on a weight basis unless otherwise indicated.

EXAMPLE I

The following example shows the preparation of a cationic polymer by reacting a polyglycidyl ether of bisphenol A with a mixture of diethylamine and diallylamine and then solubilizing with acid, 1,3-butadiene was polymerized in the presence of the cationic polymer. The resulting polymeric product was then used as a resinous vehicle for cationic electrodeposition.

The cationic polymer was prepared from the following charge:

| Ingredients | Parts by Weight (in grams) | Equivalents |
| --- | --- | --- |
| EPON 1001[1] | 583 | 1.0 |
| diethylamine | 52.8 | 0.75 |
| diallylamine | 24.2 | 0.25 |

[1]Polyglycidyl ether of bisphenol A having an epoxy equivalent of 583 commercially available from Shell Chemical Company.

Into a suitable reaction vessel under a nitrogen atmosphere was charged the EPON 1001 and a mixture of the diethyl and diallyl amines. The reaction mixture was heated to reflux and reflux temperature maintained for about 2½ hours. The reaction mixture was then cooled to room temperature.

The epoxy-amine adduct prepared as described above (180 grams, 150 grams solids) was neutralized with 13.5 grams of glacial acetic acid and thinned with 150 grams of deionized water to form a cationic polymer.

1,3-butadiene was polymerized in the presence of the cationic polymer prepared as follows:

| Ingredients | Parts by Weight (in grams) | |
| --- | --- | --- |
| cationic polymer | 113.6 | (50 parts solids) |
| water | 299.4 | |
| VAZO 64[1] | 6 | |
| tertiary-dodecyl mercaptan | 6 | |

| Ingredients | Parts by Weight (in grams) |
|---|---|
| 1,3-butadiene | 200 |

[1] Azobisisobutyronitrile commercially available from E. I. duPont de Nemours and Company.

The ingredients were charged to a reaction vessel capable of maintaining pressure. The reaction vessel was sealed and heated to 100° C. and held at this temperature with agitation for about 16 hours to complete the polymerization. The reaction product had a solids content of about 40.8 percent.

Ninety (90) grams of the reaction product prepared as described immediately above was diluted with 510 grams of deionized water to form an electrodeposition bath. The bath had a pH of 5.5 and a conductivity of 550 micromhos/cm.

Zinc phosphated steel panels were electrodeposited in the bath at 450 volts for 2 minutes at a bath temperature of 65° F. (18° C.). When the film was cured at 360° F. (182° C.) for 45 minutes, a film having a thickness of about 0.47 mil and an F pencil hardness was obtained. Untreated steel panels were electrodeposited in the bath at 430 volts for 2 minutes at a bath temperature of 66° F. (19° C.). When the films were cured at 360° F. (182° C.) for 45 minutes, a film having a thickness of 0.5 mil and an F pencil hardness was obtained.

EXAMPLE II

The following example is similar to Example I with the exception that a mixture of 1,3-butadiene and styrene were polymerized in the presence of a cationic polymer.

Styrene and butadiene monomers were polymerized in the presence of the cationic polymer of Example I as follows:

| Ingredients | Parts by Weight (in grams) | |
|---|---|---|
| cationic polymer | 113.6 | (50 parts by weight solids) |
| deionized water | 299.4 | |
| VAZO 64 | 6 | |
| tertiary-dodecyl mercaptan | 6 | |
| 1,3-butadiene | 170 | |
| styrene | 30 | |

The conditions for polymerization were as described in Example I.

The reaction product had a solids content of about 43 percent. Ninety (90) parts by weight of the reaction product was thinned with 510 parts by weight of deionized water to form an electrodeposition bath. Zinc phosphated steel panels and untreated steel panels were electrodeposited in the bath at 400 volts for 2 minutes at a bath temperature of about 67° F. (19° C.) to produce films having a thickness of 0.45 mil.

EXAMPLE III

The following example shows preparation of a cationic polymer from reacting a polyglycidyl ether of bisphenol A with a mixture of diallyl and diethyl amines. A partially capped isocyanate (curing agent) was reacted into the polymer backbone via reaction of the uncapped isocyanate groups and the hydroxyl groups of the epoxy-amine adduct. The polymer was then solubilized with acetic acid. 1,3-butadiene was polymerized in the presence of the cationic polymer.

The cationic polymer was prepared as follows:

| Ingredients | Parts by Weight (in grams) | | Equivalents |
|---|---|---|---|
| EPON 1001 | 485 | | 1.0 |
| partially capped polyisocyanate[1] | 272 | (258.4 solids) | 0.85 |
| diallylamine | 23.6 | | 0.244 |
| diethylamine | 53.4 | | 0.231 |

[1] Partially capped isocyanate formed from half-capping 2,4-toluene diisocyanate with 2-ethylhexanol in methyl butyl ketone solvent.

The EPON 1001 was charged to a reaction vessel under a nitrogen atmosphere and heated to reflux and reflux temperature maintained for about 45 minutes. The reaction mixture was cooled to 120° C. and the partially capped isocyanate added followed by the addition of 16 drops of dibutyltin dilaurate catalyst. The reaction mixture exothermed and the temperature held at 115° C. for about 30 minutes followed by cooling to 53° C. A mixture of the diallyl and diethyl amines was added and the reaction mixture heated to 120° C. and held at this temperature for about 2 hours to complete the reaction.

The epoxy-amine adduct prepared as described above (500 grams, 392.5 grams solids) was neutralized with 25.2 grams of acetic acid combined with 7.85 grams of dibutyltin dilaurate (curing catalyst) and thinned with 259.8 grams of deionized water. The cationic polymer contained about 53 percent resin solids.

1,3-butadiene was polymerized in the presence of the above-described cationic polymer as follows:

| Ingredients | Parts by Weight (in grams) |
|---|---|
| cationic polymer prepared as described above | 75.0 (37.5 parts solids) |
| deionized water | 324.7 |
| VAZO 64 | 6.4 |
| tertiary-dodecyl mercaptan | 6.4 |
| 1,3-butadiene | 212.5 |

The conditions for polymerization were as described in Example I. The reaction product contained 48 percent by weight resin solids.

EXAMPLE IV

A mixture of styrene and butadiene was polymerized in the presence of the cationic polymer described in Example III as follows:

| Ingredients | Parts by Weight (in grams) |
|---|---|
| cationic polymer of Example III | 75 (37.5 parts solids) |
| deionized water | 324.7 |
| VAZO | 6.4 |
| tertiary-dodecyl mercaptan | 6.4 |
| styrene | 63.7 |
| 1,3-butadiene | 148.8 |

The conditions for polymerization were as described in Example I. The reaction product contained 40.7 percent resin solids.

EXAMPLE V

The following example shows the preparation of a polyglycidyl ether of bisphenol A and 2,2-bis(3-allyl-4-hydroxyphenyl)propane. The polyglycidyl ether was then reacted with diethylamine and neutralized with acetic acid. A mixture of styrene and 1,3-butadiene was then polymerized in the presence of the cationic polymer. The resulting polymeric product was then combined with pigment paste to form a cationic electrodeposition bath and evaluated for cationic electrodeposition.

The polyglycidyl ether of bisphenol A and 2,2-bis(3-allyl-4-hydroxyphenyl)propane was prepared as follows:

| Ingredients | Parts by Weight (in grams) |
| --- | --- |
| EPON 829[1] | 1252 |
| 2,2-bis(3-allyl-4-hydroxyphenyl)propane | 311 |
| methyl isobutyl ketone | 366 |

[1] Polyglycidyl ether of bisphenol A commercially available from Shell Chemical Company having an epoxy equivalent of 193-203.

The EPON 829 and 2,2-bis(3-allyl-4-hydroxyphenyl)propane were charged to a reaction vessel and heated to 170° C. over a period of about ½ hour under a nitrogen atmosphere. The reaction temperature was then raised to 190° C. and held for ½ hour followed by cooling to 62° C. and thinning the reaction mixture with methyl isobutyl ketone. The reaction mixture had a resin solids content of 79.1 percent, a Gardner-Holdt viscosity of $W^-$ and an epoxy equivalent weight of 422.

The polyepoxide prepared as described above was reacted with diethylamine to form a polyepoxide-amine adduct as follows:

| Ingredients | Parts by Weight (in grams) | Equivalents |
| --- | --- | --- |
| polyepoxide prepared as described above | 844 | 2.0 |
| diethylamine | 141 | 1.9 |

The epoxy-containing polymer was charged to a reaction vessel and heated to 40° C. under a nitrogen atmosphere. The diethylamine was added over the period of about 30 minutes with the temperature slowly rising to 64° C. At the completion of the addition, the reaction mixture was heated to reflux at 120° C. and maintained at reflux for about 2 hours. The reaction mixture had a solids content of 82.8 percent and a Gardner-Holdt viscosity of $Z^4-Z^5$.

The epoxy-amine adduct prepared as described above was then solubilized with acetic acid and thinned with deionized water as follows:

| Ingredients | Parts by Weight |
| --- | --- |
| epoxy-amine adduct | 98 |
| acetic acid | 12 |
| deionized water | 98 |

The acid-solubilized product contained 38 percent resin solids.

A mixture of styrene and 1,3-butadiene was polymerized in the presence of the above-described cationic polymer as follows:

| Ingredients | Parts by Weight |
| --- | --- |
| cationic polymer prepared as described above | 103.8 |
| deionized water | 368.7 |
| VAZO 64 | 6.5 |
| tertiary-dodecyl mercaptan | 6.5 |
| styrene | 48.6 |

| Ingredients | Parts by Weight |
| --- | --- |
| 1,3-butadiene | 113.4 |

The reaction conditions were as described in Example I. The reaction mixture had a solids content of 33.1 percent.

The reaction product prepared as described above (650 grams) was thinned with 2500 grams of deionized water and combined with 300 grams of pigment paste as described in U.S. Pat. No. 4,115,226 col. 9, lines 26-65 and col. 10, lines 52-66 to form a cationic electrodeposition bath.

Untreated steel panels were electrodeposited in the bath at 300 volts to produce a coating having a thickness of 0.9 mil. Zinc phosphated steel panels were electrodeposited at 200 volts to produce a coating having a thickness of 0.85 mil. The panels were cured at 400° F. (204° C.) for one hour. The panels with the cured coatings thereon were scribed with an "X" and exposed to a salt spray fog in accordance with the provisions of ASTM D-117. The panels were removed from the chamber, dried, the scribe mark taped with masking tape, the tape pulled off at a 45° angle, and the creepage from the scribe mark measured. Creepage is the rusted darkened area where the coating has lifted from the panel surface. After two weeks exposure, the untreated steel panels showed ¼ inch scribe creepage and the zinc phosphated steel panels 3/16 inch scribe creepage.

Zinc phosphated and untreated steel panels were electrodeposited in the bath at 200 volts. The coated panels were then cured at 400° F. (204° C.) for 40 minutes.

EXAMPLE VI

The following example is similar to Example V with the exception that a mixture of styrene, 1,3-butadiene and hydroxypropyl methacrylate were polymerized in the presence of the cationic polymer.

A polyglycidyl ether of bisphenol A and 2,2-bis(3-allyl-4-hydroxyphenyl)propane was prepared as follows:

| Ingredients | Parts by Weight (in grams) |
| --- | --- |
| EPON 829 | 1419 |
| 2,2-bis(3-allyl-4-hydroxyphenyl)propane | 133 |
| methyl isobutyl ketone | 162 |

The EPON 829 and 2,2-bis(3-allyl-4-hydroxyphenyl)propane were charged to a reaction vessel under a nitrogen atmosphere and heated to 170° C. to initiate an exotherm. The reaction mixture was held at reflux for about ½ hour followed by cooling to 50° C. and thinning with the methyl isobutyl ketone. The polyepoxide has a resin solids content of 88.5 percent, a Gardner-Holdt viscosity of $Y^-$ and an epoxy equivalent of 277.

The polyepoxide prepared as described above was reacted with diethylamine to form an epoxide-amine adduct as follows:

| Ingredients | Parts by Weight (in grams) | Equivalents |
| --- | --- | --- |
| polyepoxide | 830 | 3.00 |

-continued

| Ingredients | Parts by Weight (in grams) | Equivalents |
|---|---|---|
| diethylamine | 211 | 2.85 |

The polyepoxide was charged to a reaction vessel and heated to 40° C. under a nitrogen atmosphere. The diethylamine was added over a ½ hour period with the temperature rising to 117° C. The reaction mixture was heated to 120° C. and held for 2 hours at this temperature. The reaction mixture had a solids content of 91.4 percent and a Gardner-Holdt viscosity of $Z^{7-}$.

The polyepoxide-amine adduct prepared as described above (104.1 parts) was neutralized with 14.4 grams glacial acetic acid and thinned with 104.1 grams of deionized water.

The cationic polymer had a resin solids content of 43.5 percent.

Hydroxypropyl methacrylate, styrene and 1,3-butadiene were polymerized in the presence of the above-described cationic polymer as follows:

| Ingredients | Parts by Weight (in grams) |
|---|---|
| cationic polymer prepared as described above | 92.9 |
| deionized water | 420.0 |
| VAZO 64 | 6.5 |
| tertiary-dodecyl mercaptan | 6.5 |
| hydroxypropyl methacrylate | 16.2 |
| styrene | 32.4 |
| 1,3-butadiene | 113.4 |

The reaction conditions were as described in Example I. The reaction product had a solids content of 28.4 percent.

EXAMPLE VII

The following example shows the preparation of a polyglycidyl ether of bisphenol A and 2,2-bis(3-allyl-4-hydroxyphenyl)propane. The polyglycidyl ether was then reacted with N-methylethanolamine, solubilized with acetic acid to form a cationic polymer. A mixture of hydroxypropyl methacrylate, styrene and 1,3-butadiene was polymerized in the presence of the cationic polymer. The resultant polymeric product was then combined with a pigment paste, a blocked isocyanate crosslinking agent to form a cationic electrodeposition bath, and evaluated for cationic electrodeposition.

The polyglycidyl ether was prepared as follows:

| Ingredients | Parts by Weight (in grams) |
|---|---|
| EPON 829 | 635 |
| 2,2-bis(3-allyl-4-hydroxyphenyl)propane | 250 |
| methyl isobutyl ketone | 205 |

The EPON 829 and 2,2-bis(3-allyl-4-hydroxyphenyl)propane were charged to a reaction vessel and heated to 170° C. under a nitrogen atmosphere to initiate an exotherm. The reaction mixture was held for about ½ hour at reflux (190° C.), cooled to 85° C., followed by thinning with methyl isobutyl ketone. The reaction mixture had a solids content of about 80 percent, a Gardner-Holdt viscosity of $Z^1$-$Z^2$ and an epoxy equivalent of 603.

The polyepoxide prepared as described above was then reacted with N-methylethanolamine as follows:

| Ingredients | Parts by Weight (in grams) | Equivalents |
|---|---|---|
| polyepoxide prepared as described above | 603 | 1.00 |
| N-methylethanolamine | 71 | 0.95 |

The polyepoxide was charged to a reaction vessel and heated to 40° C. under a nitrogen atmosphere. The N-methylethanolamine was added over a ½ hour period with the temperature increasing to 85° C. The reaction mixture was heated to 120° C., held for 2 hours and cooled to 102° C., followed by the addition of 54 parts of dibutyltin dilaurate. Acetic acid (57 parts) was then added to the reaction mixture followed by thinning with 700 parts of deionized water. The reaction mixture had a solids content of 41.2 percent.

Hydroxypropyl methacrylate, styrene and 1,3-butadiene were polymerized in the presence of the cationic polymer prepared as described above.

| Ingredients | Parts by Weight (in grams) |
|---|---|
| cationic polymer | 73.8 |
| deionized water | 429.0 |
| VAZO 64 | 3.4 |
| tertiary-dodecyl mercaptan | 3.4 |
| hydroxypropyl methacrylate | 17.2 |
| styrene | 34.4 |
| 1,3-butadiene | 120.5 |

The reaction conditions were as described in Example I. The resulting polymeric product had a resin solids content of 29 percent.

A pigment paste was prepared as follows:

| Ingredients | Parts by Weight (in grams) |
|---|---|
| iron oxide | 149.6 |
| lead silicate | 17.6 |
| strontium chromate | 8.8 |
| acid-solubilized cationic polymer of Example VI | 101 |
| deionized water | 273 |

The above ingredients were charged to a sand mill in the order listed and ground to a Hegman No. 7 grind.

A capped isocyanate was prepared by reacting methyldiethanolamine with toluene diisocyanate (1:2 molar ratio) to form an amino nitrogen containing isocyanate terminated prepolymer. This NCO-terminated prepolymer was then capped with one mole of 2-ethylhexanol and one mole of an alcohol which was formed from reacting one mole of trimethylolpropane with 2 moles of the monourethane of toluene diisocyanate reacted with 2-ethylhexanol. The capped isocyanate was solubilized and dispersed in water as follows:

| Ingredients | Parts by Weight (in grams) |
|---|---|
| capped isocyanate | 1635 |
| acetic acid | 26.9 |
| deionized water | 1338 |

The capped isocyanate was charged to a Cowles mixer followed by the addition of the acetic acid and thinning with deionized water. The blocked isocyanate was neutralized to the extent of 50 percent of the total theoretical neutralization and contained 40.64 percent resin solids.

An electrodeposition bath was prepared by mixing the following in the order indicated:

| Ingredients | Parts by Weight (in grams) |
|---|---|
| deionized water | 1000 |
| polymeric product prepared as described above | 1310 |
| acid-solubilized capped isocyanate prepared as described above | 400 |
| pigment paste prepared as described above | 230 |
| deionized water | 40 |

Zinc phosphated steel panels were electrodeposited in the bath at 340 volts. When the panels were baked at 400° F. (204° C.) for 20 minutes, films having a thickness of 0.9 mil were obtained. When subjected to a salt spray fog as described above in connection with Example V, 3/16 inch scribe creepage was noted. Untreated steel panels were electrodeposited at 340 volts. When the panels were baked at 400° F. (204° C.) for 20 minutes, films having a thickness of 1.0 mil were obtained. When exposed to a salt spray fog as described above, ⅜ inch scribe creepage was noted.

When zinc phosphated and untreated steel panels were electrocoated at 340 volts and the films cured at baking at 350° F. (117° C.) for 30 minutes, films having a thickness of 0.9 mil were obtained. When exposed to a salt spray fog as described above, the zinc phosphated steel panels evidenced 3/16 inch scribe creepage and the untreated steel panels exhibited ⅜ inch scribe creepage.

EXAMPLE VIII

The following example shows the preparation of a polyglycidyl ether of bisphenol A and 2,2-bis(3-allyl-4-hydroxyphenyl)propane. The polyglycidyl ether was reacted with N-methylethanolamine, solubilized with acetic acid and then used as a dispersant for the polymerization of a mixture of hydroxyproply methacrylate, butyl acrylate and butadiene monomers.

The polyepoxide was prepared as follows:

| Ingredients | Parts by Weight (in grams) |
|---|---|
| EPON 829 | 635 |
| 2,2-bis(3-allyl-4-hydroxyphenyl)-propane | 250 |
| methyl isobutyl ketone | 205 |

The EPON 829 and 2,2-bis(3-allyl-4-hydroxyphenyl)propane were charged to a reaction vessel and heated to 170° C. under a nitrogen atmosphere to initiate an exotherm. The temperature rose to 190° C. and the reaction mixture was held for ½ hour at 190° C. The reaction mixture was cooled to 108° C. followed by the addition of methyl isobutyl ketone. The reaction mixture contained 78.9 percent resin solids, had a viscosity of $Z_2-Z_3$ and an epoxy equivalent of 621.

The polyepoxide prepared as described above was then combined with 300 parts of the polyepoxide of Example VII. The blend contained 79.2 percent resin solids, had a viscosity of $Z_2-Z_3$ and an epoxy equivalent of 615.

The blend of polyepoxides prepared as described above was then reacted with N-methylethanolamine as follows:

| Ingredients | Parts by Weight (in grams) | Equivalents |
|---|---|---|
| blend of polyepoxides | 1206 | 2.00 |
| N-methylethanolamine | 142 | 1.90 |

The polyepoxide were heated to 40° C. under a nitrogen atmosphere followed by the addition of the N-methylethanolamine which was added over a ½ hour period with the temperature rising to 85° C. The reaction mixture was then heated to 120° C., held for 2 hours, cooled to 102° C. followed by the addition of 172.8 grams of dibutyltin dilaurate.

The reaction product was neutralized with acetic acid by charging to a reaction vessel 1120 grams of deionized water and 46 grams of glacial acetic acid. The polyepoxide-amine adduct prepared as described above (356 grams) was added to the vessel with agitation followed by the addition of an additional 18.4 parts of acetic acid. The neutralized polymer had a resin solids content of 41.4 percent and was neutralized to the extent of 70 percent of the total theoretical neutralization equivalent.

A mixture of hydroxypropyl methacrylate, butyl acrylate and butadiene were polymerized in the presence of the cationic polymer as follows:

| Ingredients | Parts by Weight (in grams) |
|---|---|
| aqueous dispersion of cationic polymer prepared as described above | 61.4 |
| deionized water | 436.0 |
| VAZO 64 | 5.3 |
| tertiary-dodecyl mercaptan | 5.3 |
| hydroxypropyl methacrylate | 26.5 |
| butyl acrylate | 70.7 |
| 1,3-butadiene | 79.6 |

The reaction conditions were as generally described in Example I. The reaction product had a total solids content of 30.2 percent.

I claim:

1. A stable, aqueous dispersion of a cationic polymeric product prepared by polymerizing in aqueous medium under free radical initiated addition polymerization conditions:
   (A) an aqueous dispersed phase of a polymerizable, ethylenically unsaturated monomer composition, in the presence of
   (B) an at least partially acid neutralized polyepoxide-primary and/or secondary amine adduct which contains pendent unsaturation.

2. The dispersion of claim 1 in which the monomer composition (A) includes a diene monomer.

3. The dispersion of claim 2 in which the diene is 1,3-butadiene.

4. The dispersion of claim 1 in which the monomer composition (A) includes an alkyl ester of acrylic or methacrylic acid containing from 1 to 8 carbon atoms in the alkyl group.

5. The dispersion of claim 1 in which the monomer composition (A) includes styrene.

6. The dispersion of claim 1 in which the polyepoxide-amine adduct contains $CH_2=CH-$ unsaturation.

7. The dispersion of claim 1 in which the pendent unsaturation is incorporated into the polyepoxide-amine adduct through the amine reactant.

8. The dispersion of claim 1 in which the polyepoxide is a polyglycidyl ether of a cyclic polyol.

9. The dispersion of claim 8 in which the cyclic polyol is a polyphenol.

10. The dispersion of claim 9 in which the polyphenol is 2,2-bis-(3-allyl-4-hydroxyphenyl)propane.

11. The dispersion of claim 1 in which the polyepoxide-amine adduct has an average molecular weight of from about 500 to 5000.

12. The dispersion of claim 1 in which the polymerization is conducted in the presence of a free radical polymerization catalyst.

13. The dispersion of claim 12 in which the polymerization is conducted in the presence of a chain transfer agent.

14. The dispersion of claim 13 in which the chain transfer agent is tertiary-dodecyl mercaptan.

15. The dispersion of claim 1 which contains from about 50 to 97.5 percent by weight of (A) and from about 50 to 2.5 percent by weight of (B), the percentage by weight being based on total weight of (A) and (B).

16. A coating composition comprising the aqueous dispersion of the polymeric products of any of claims 1–15.

17. A method of electrocoating an electrically conductive surface serving as a cathode in an electrical circuit comprising said cathode, an anode and an aqueous electrodepositable composition which comprises passing an electric current between said cathode and anode and wherein the electrodepositable composition comprises an aqueous dispersion of the polymeric product of any of claims 1–5.

18. A method of preparing a polymeric product comprising:
(A) dispersing a polymerizable, ethylenically unsaturated monomer composition in aqueous medium in the presence of an at least partially acid-neutralized polyepoxide-primary and/or secondary amine adduct which contains pendent unsaturation.
(B) subjecting the dispersion prepared in (A) to free radical initiated addition polymerization conditions so as to form a stable aqueous dispersion of a cationic polymeric product.

19. The method of claim 18 in which the monomer composition (A) includes a diene monomer.

20. The method of claim 19 in which the diene is 1,3-butadiene.

21. The method of claim 18 in which the monomer composition (A) includes an alkyl ester of acrylic or methacrylic acid containing from 1 to 8 carbon atoms in the alkyl group.

22. The method of claim 18 in which the monomer composition (A) includes styrene.

23. The method of claim 18 in which the polyepoxide-amine adduct contains $CH_2=CH-$ unsaturation.

24. The method of claim 18 in which the pendent unsaturation is incorporated into the polyepoxide-amine adduct through the amine reactant.

25. The method of claim 18 in which the polyepoxide is a polyglycidyl ether of a cyclic polyol.

26. The method of claim 25 in which the cyclic polyol is a polyphenol.

27. The method of claim 26 in which the polyphenol is 2,2-bis-(3-allyl-4-hydroxyphenyl)propane.

28. The method of claim 18 in which the polyepoxide-amine adduct has an average molecular weight of from about 500 to 5000.

29. The method of claim 18 in which the polymerization is conducted in the presence of a free radical polymerization catalyst.

30. The method of claim 29 in which the polymerization is conducted in the presence of a chain transfer agent.

31. The method of claim 30 in which the chain transfer agent is tertiary-dodecyl mercaptan.

32. The method of claim 18 which contains from about 50 to 97.5 percent by weight of (A) and from about 50 to 2.5 percent by weight of (B), the percentage by weight being based on total weight of (A) and (B).

33. The method of claim 18 in which the dispersion (A) is subjected to free radical polymerization conditions by heating in the presence of a free radical initiator.

34. The method of claim 33 in which heating is conducted at 75°–100° C. for about 2 to 20 hours.

* * * * *

UNITED STATES PATENT AND TRADEMARK OFFICE
CERTIFICATE OF CORRECTION

PATENT NO. : 4,297,261
DATED : October 27, 1981
INVENTOR(S) : Edward L. Jozwiak, Jr.

It is certified that error appears in the above-identified patent and that said Letters Patent are hereby corrected as shown below:

Column 15, line 30, "at" (second occurrence) should be --by--.

Column 15, line 35, "3/8" should be --1/8--.

Column 15, line 44, "hydroxyproply" should be --hydroxypropyl--.

Column 17, line 36, "claims 1-5" should be --claims 1-15--.

Signed and Sealed this

Nineteenth Day of January 1982

[SEAL]

Attest:

GERALD J. MOSSINGHOFF

Attesting Officer    Commissioner of Patents and Trademarks